US008719842B2

(12) United States Patent
Bhogal et al.

(10) Patent No.: US 8,719,842 B2
(45) Date of Patent: May 6, 2014

(54) TRANSMITTING A CALENDAR EVENT IN TARGET CALENDARING SYSTEM FORMAT

(71) Applicant: International Business Machines Corporation, Armonk, NY (US)

(72) Inventors: Kulvir S. Bhogal, Fort Worth, TX (US); Gregory J. Boss, American Fork, UT (US); Rick A. Hamilton, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/852,544

(22) Filed: Mar. 28, 2013

(65) Prior Publication Data
US 2013/0212597 A1    Aug. 15, 2013

Related U.S. Application Data

(63) Continuation of application No. 11/242,658, filed on Oct. 4, 2005, now abandoned.

(51) Int. Cl.
*G06F 3/00* (2006.01)
*G06F 15/16* (2006.01)

(52) U.S. Cl.
USPC ............................ 719/313; 719/318; 709/206

(58) Field of Classification Search
None
See application file for complete search history.

(56) References Cited

U.S. PATENT DOCUMENTS

| 4,866,611 | A | 9/1989 | Cree et al. |
| 5,956,489 | A * | 9/1999 | San Andres et al. ........ 709/221 |
| 6,401,104 | B1 | 6/2002 | LaRue et al. |
| 6,728,786 | B2 | 4/2004 | Hawkins et al. |
| 6,760,728 | B1 | 7/2004 | Osborn |
| 6,799,190 | B1 | 9/2004 | Boothby |
| 6,820,096 | B1 | 11/2004 | Kanevsky et al. |
| 7,007,003 | B1 | 2/2006 | Rybicki |
| 7,007,041 | B2 | 2/2006 | Multer et al. |

(Continued)

FOREIGN PATENT DOCUMENTS

| EP | 1158438 A2 | 11/2001 |
| WO | 0163391 A2 | 8/2001 |
| WO | 0207411 A2 | 1/2002 |

OTHER PUBLICATIONS

"Implementation of a Calendar Application Based on SyD Coordination Links", Prasad, 2003, pp. 1-8.*
U.S. Appl. No. 11/242,658, filed Oct. 4, 2005, 39 pages.

(Continued)

*Primary Examiner* — Tuan Dao
(74) *Attorney, Agent, or Firm* — Yee & Associates, P.C.; Arthur J. Samodovitz

(57) ABSTRACT

An agent may receive an event from a source calendaring system, wherein the event specifies a person, perhaps including a uniform resource locator, having disparate calendaring system. The disparate calendaring system may use a native event format for coordinating events. The agent may lookup a template to convert the event to a native event. The agent may transmit a message with attributes such as a unique identifier to the disparate calendaring system. If the disparate calendaring system acknowledges the event with a success, the agent may log the occurrence of a success. Agent may transmit additional messages having native events to additional disparate systems.

18 Claims, 5 Drawing Sheets

(56) References Cited

U.S. PATENT DOCUMENTS

| | | | |
|---|---|---|---|
| 7,035,913 | B2 | 4/2006 | Culp et al. |
| 7,209,911 | B2 | 4/2007 | Boothby et al. |
| 7,334,000 | B2 | 2/2008 | Chhatrapati et al. |
| 7,418,090 | B2 | 8/2008 | Reding et al. |
| 7,509,304 | B1 * | 3/2009 | Pather et al. .................. 719/318 |
| 8,301,701 | B2 * | 10/2012 | Goodman et al. ............ 709/206 |
| 8,359,540 | B2 | 1/2013 | Darling |
| 8,417,782 | B2 | 4/2013 | Tendjoukian et al. |
| 2001/0044805 | A1 | 11/2001 | Multer et al. |
| 2003/0061087 | A1 * | 3/2003 | Srimuang ......................... 705/8 |
| 2003/0065742 | A1 | 4/2003 | Culp et al. |
| 2003/0131142 | A1 * | 7/2003 | Horvitz et al. ................ 709/313 |
| 2004/0073615 | A1 | 4/2004 | Darling |
| 2004/0143472 | A1 | 7/2004 | Estrada et al. |
| 2004/0205263 | A1 * | 10/2004 | Sivaraman et al. ............. 710/21 |
| 2005/0038863 | A1 * | 2/2005 | Onyon et al. ................ 719/313 |
| 2005/0053214 | A1 | 3/2005 | Reding et al. |
| 2006/0129445 | A1 | 6/2006 | McCallum |
| 2007/0016646 | A1 * | 1/2007 | Tendjoukian et al. ........ 709/206 |
| 2007/0073581 | A1 * | 3/2007 | Kempe et al. .................. 705/14 |
| 2007/0079260 | A1 | 4/2007 | Bhogal et al. |

OTHER PUBLICATIONS

Silverberg et al., "iCalendar Transport-Independent Interoperability Protocol (iTIP) Scheduling Events, BusyTime, To-dos and Journal Entries", Standards Track, Network Working Group, The Internet Society, Nov. 1998, pp. 1-109.

Dawson et al., "iCalendar Message-Based Interoperability Protocol (iMIP)", IETF Standard, Internet Engineering Task Force, IETF, CH, Nov. 1998, pp. 1-17.

Dawson et al., "Internet Calendaring and Scheduling Core Object Specification (iCalendar)", IETF Standard, Internet Engineering Task Force, IETF, CH, Nov. 1998, pp. 1-148.

Search Report issued on Mar. 4, 2007 for PCT/EP2006/066954, 2 pages.

Office Action issued on Nov. 15, 2007 for U.S. Appl. No. 11/242,658, 16 pages.

Final Office Action issued on Apr. 28, 2008 for U.S. Appl. No. 11/242,658, 16 pages.

Office Action issued on Oct. 28, 2008 for U.S. Appl. No. 11/242,658, 21 pages.

Final Office Action issued on Jun. 10, 2009 for U.S. Appl. No. 11/242,658, 11 pages.

* cited by examiner

TRANSMITTING A CALENDAR EVENT IN TARGET CALENDARING SYSTEM FORMAT This application is a continuation of U.S. patent application Ser. No. 11/242,658 filed Oct. 4, 2005, status pending.

BACKGROUND OF THE INVENTION

1. Field of the Invention

The present invention relates to the field of coordinating schedule entries in multiple electronic calendars and more specifically, to formatting a calendar request from a format of a source to a format of the target.

2. Description of the Related Art

Among office workers, for example, technical, administrative, and sales staff, there has been a growing trend to operate at sites other than that of the employer. Visits to clients can be of varying durations and often may last months. Consequently, such workers may have access to a client's computer network and be given permissions and logins for standard office software, including calendaring tools.

Typically, this means that the itinerant worker, sometimes called a contractor, has multiple bosses to whom she should report. Often the basic calendaring tools used at the client's offices vary from those used by the employer. This means that it is often necessary for the worker to allocate time on a client's calendaring system and then login to the employer's calendaring system and redundantly enter the same meeting details. The problem is exacerbated if the worker has, in addition, a personal organizer or home computer on which a calendar is hosted.

In addition, there are groups of people who frequently need to orchestrate meetings across several organizations. These include venture capitalists, diplomats, industry standard constituents, among others. One way to electronically mediate invitations to meetings is to describe the meeting details in the body of an email in straightforward English. Though this is a fairly universal language in the business world, it still means a lot of redundant human keystrokes to allocate the timed event in each recipient's calendar tool.

In recent years, a standard called the iCalendar Transport-Independent Interoperability Protocol has been proposed in Request For Comments (RFC) 2446, of the internet engineering task force. The protocol is based on messages sent from an originator to one or more recipients. The iCalendar feature does not provide for a way to be backwards compatible with proprietary calendar software, vis-à-vis meeting invitations and synchronizing scheduled events.

In addition, Lotus Notes® copies a server copy of a calendar replicated with a local copy on a predefined schedule. The replication is a form of synchronization and can be done with an arbitrary number of clients. This replication only supports multiple instances of the same calendar system and does not support synchronization between disparate calendar systems made by different manufacturers.

Thus, it would be helpful to provide a mechanism by which a user may, in an ad hoc manner, update an event on a calendar in which the user is currently logged and send a synchronization event to another calendar system to which the user is entitled to update.

SUMMARY OF THE INVENTION

The aspects of present invention provide a method and computer usable code to propagate an event from a source computer or platform to a target calendaring system. An event is received from the source computer, wherein the event has an attribute. The event is formatted into a native event using a target template for the target calendaring system in response to obtaining the event. A source attribute is appended to the native event. Responsive to appending the source attribute to the native event, the native event is sent to the target calendaring system to form a sent event. The sent event is logged.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
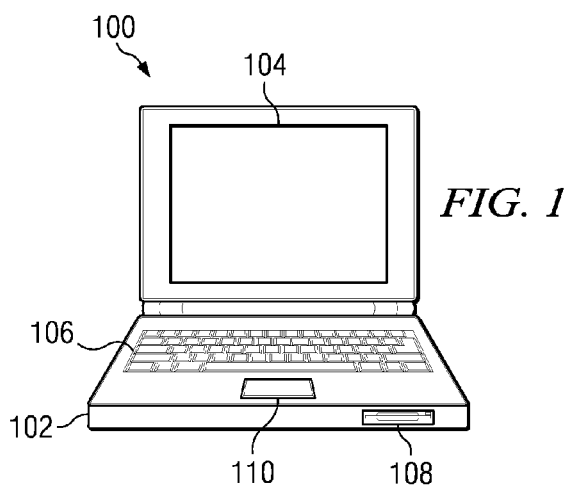
FIG. 1 shows a pictorial representation of a data processing system in accordance with a first illustrative embodiment of the present invention.

With reference now to the figures and in particular with reference to FIG. 1, a pictorial representation of a data processing system in which the present invention may be implemented is depicted in accordance with a preferred embodiment of the present invention. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer.

Computer 100 also preferably includes a graphical user interface (GUI) that may be implemented by means of systems software residing in computer readable media in operation within computer 100.

Figure 2:
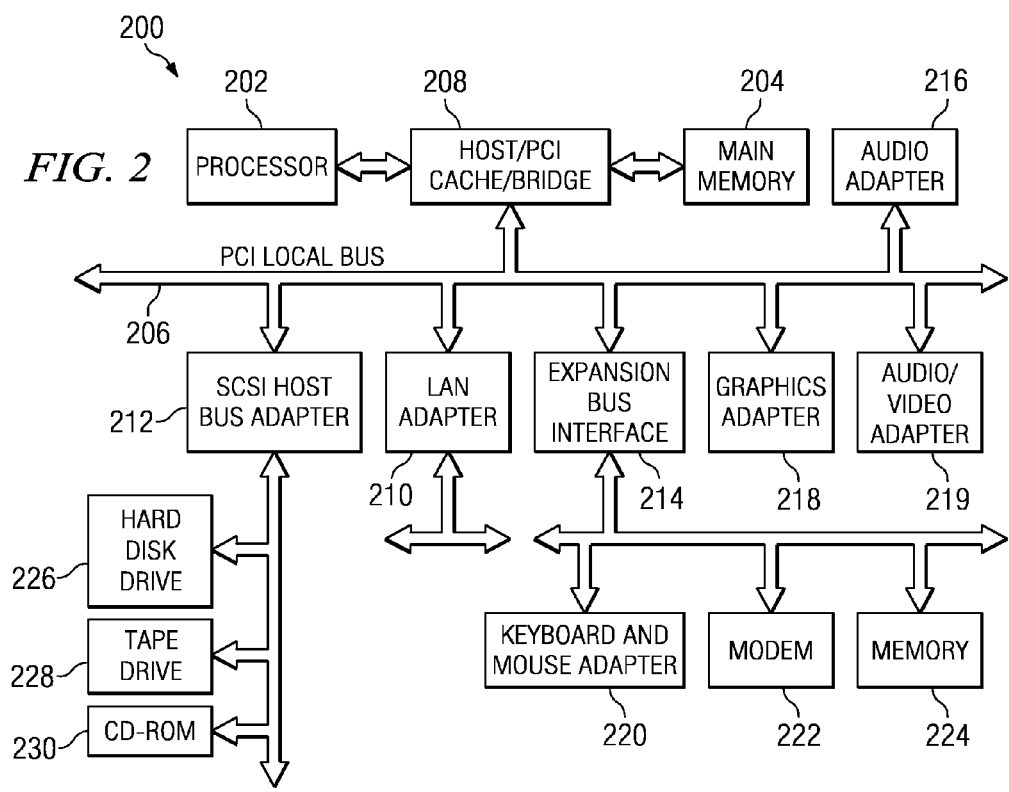
FIG. 2 shows a block diagram of a data processing system in accordance with an illustrative embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, or memory 224.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to, or in place of, the hardware depicted in FIG. 2. Also, the processes of the present invention may be applied to a multiprocessor data processing system.

For example, data processing system may be a personal digital assistant (PDA), which is configured with flash memory to provide non-volatile memory for storing operating system files and/or user-generated data. The depicted example in FIG. 2 and above-described examples are not meant to imply architectural limitations. For example, data processing system also may be a tablet computer or telephone device in addition to taking the form of a PDA.

One or more illustrative embodiments may provide an agent that, in an ad hoc manner, updates an event on a user's open calendar and sends a synchronization event to another calendar system to which the user is entitled to update.

Figure 5:
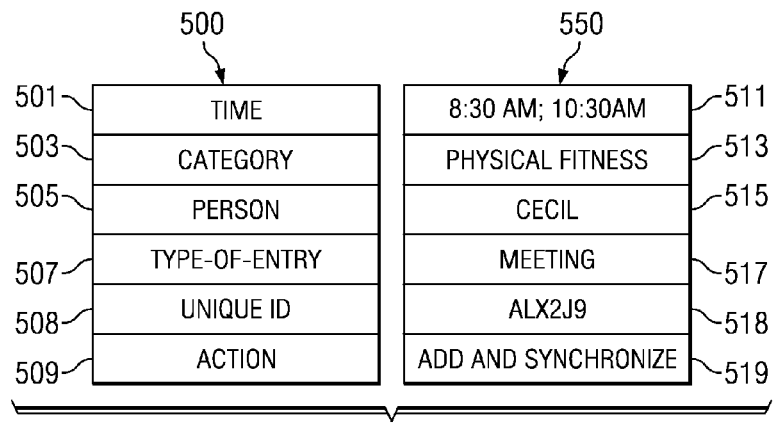
FIG. 5 shows a general set of fields in a data structure for an event in accordance with an illustrative embodiment of the present invention.

An agent, perhaps residing on a common platform with a user's calendar system, may receive an event from the platform. An event is a time that a user has set aside for a certain activity in the future. An event may be, for example, a doctor's appointment, and would include attributes such as time, and an indication of the type or class of event, in this case, "appointment". For example, "doctor's appointment at 4:30 pm Aug. 11, 2005", wherein each attribute is stored to a data field or message field that comprises the event. FIG. 5 shows more examples of an event. The attribute associated with an event will vary depending on the type of event.

The agent looks up an entry based on a target calendaring system specified in the event. In this example, the entry specifies a filter criterion and a template or format of the target calendaring system. The filter criterion may be predetermined by a user setting one or more conditions for an event to be transmitted. Likewise, the user may set, in advance, the template for the target calendar. Such aspects of the event may be relatively stable and unchanged for lengthy periods of time.

If the agent determines that the filter criterion, perhaps based on work hours, is met, the agent proceeds further. Agent may format the event into an event or message native to the target calendar, based on the target template found in the entry. Other embodiments may use other filter criteria, for example, an agent may restrict sending events to a target calendaring system associated with a user's work where the filter criterion is "allow all categories of events except 'dates'". Thus, if an event satisfies the criterion, the agent takes further actions, such as formatting the event.

The target template translates fields or attributes of an event to fields that are acceptable to a target calendaring system or target calendar. For example if the source has a field that is called "type of event", but the target calendar has a field that is called "category", the substance of each field may be the same. Therefore the target template will show a correlation or mapping from the first calendar system field to the target calendar system field. The agent may append a source attribute to the native event. The agent may append a unique identifier to the native event. Agent then sends the event to the target calendaring system. Agent may keep a log of the sent event.

Figure 3:
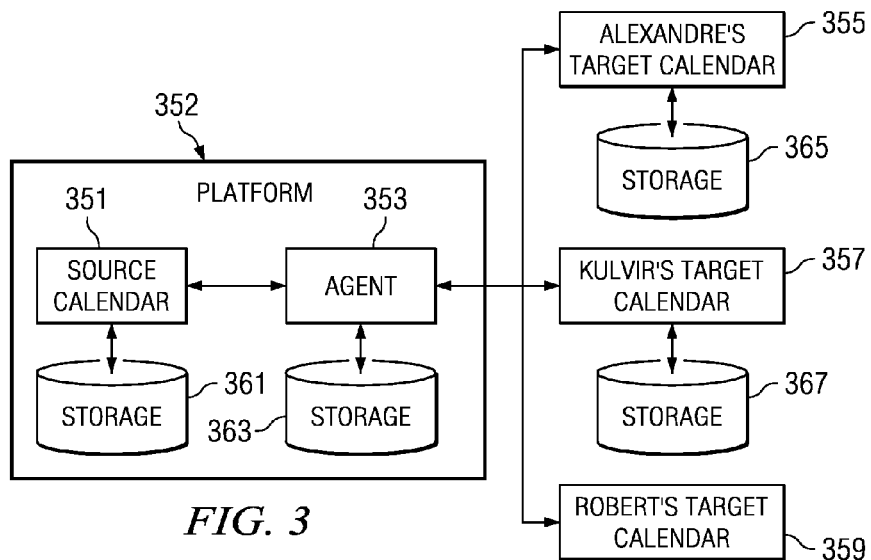
FIG. 3 shows a block diagram within a network having multiple target calendaring systems in accordance with an illustrative embodiment of the present invention.

FIG. 3 shows an illustrative embodiment of the present invention where source calendar application 351 or source calendaring system may interact with peers that may be hosted on differing domains and vary in that such peers use different proprietary calendaring systems. Source calendar application 351 uses a storage system 361. An illustrative embodiment agent 353 may use storage system 363. Agent 353 and source calendar application 351 may be co-resident on a common platform 352. Three calendaring applications, Alexandre's target calendar 355, Kulvir's target calendar 357, and Robert's target calendar 359 may each reside on different systems, using storage system 365, storage system 367, and storage system 369, respectively. Platform 352 may be a computer, for example, computer 100, of FIG. 1.

Figure 4:
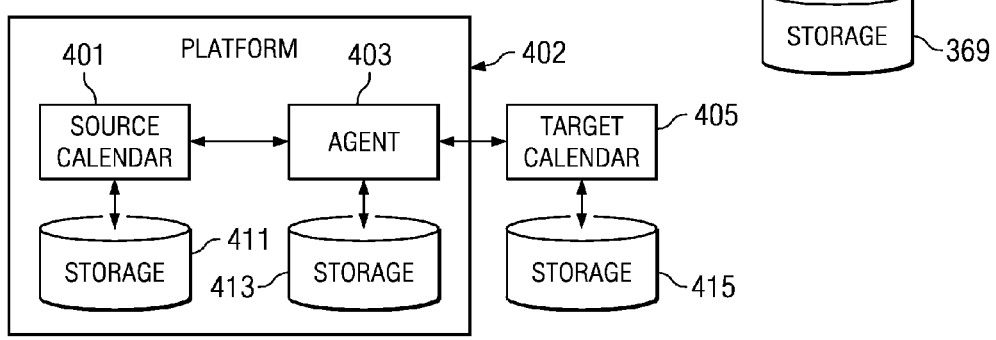
FIG. 4 shows a block diagram within a network in accordance with an illustrative embodiment of the present invention.

FIG. 4 shows an illustrative embodiment of the present invention that may operate to link a source calendar to a target calendar. Source calendar 401 may be an application operating on a data processing system. Target calendar 405 may be an application operating on a data processing system. Often, Source calendar 401 and target calendar 405 are resident on separate processing systems. However, it is appreciated that a corporate owner of a network of processing systems could host both source calendar 401 and target calendar 405 on a common computer. Source calendar 401 may be on a network in a different administrative domain than target calendaring system or target calendar 405. Source calendar 401 and target calendar 405 may store data for a single account, often associated with a user, on source storage system 411 and target storage system 415, which may be persistent storage or volatile storage.

An illustrative embodiment of the present invention may reside on platform 402. Platform 402 may be a computer, for example, computer 100, of FIG. 1. An illustrative embodiment may be agent 403, which may reside on the common platform with source calendar 401. Agent storage 413 may provide persistent or volatile storage for user files, and temporary data of the embodiment. Interconnect between source calendar 401, agent 403, and target calendar 405 may be via wired or wireless networks, including a direct physical connection capable of supporting, for example, packet transfers.

FIG. 5 shows a generally described data structure for a message or event 500 that an agent may to attempt to synchronize disparate calendars. Event 500 is made up of attributes, such as, time 501, having a beginning time, possibly including a date, and optionally an end time. Category 503 may be one or more words, for example, "physical fitness", "after hours", "anniversary", etc., that may be used to generally categorize life's activities. Person 505 may be a person's name or nickname. In addition, person 505 may be an email address. Type of entry 507 may be "appointment", "meeting", "all day event", or "anniversary", that is, situations that may require being with one or more other people. Unique identifier 508 may be a serial number unique within the sending calendar system, for example, source calendar 401 of FIG. 4. A unique identifier functions as a form of context so that an agent may receive a feedback message from a target system concerning any event previously sent. When an agent receives a message carrying the unique identifier and a status, the agent may match the unique identifier to a log and update the status accordingly. Action 509 may represent a state of whether the calendar event has been synchronized with a target calendar system.

An agent may group the attributes of time, category, person, type of entry, unique identifier, and action into a common set. As such, an event may be comprised of one or more such sets, one set for each target calendaring system. Each set has a different unique identifier 508. Each set may have a different person attribute 505. A person attribute is a unique name for a person within the source calendaring system, and includes, for example, nicknames and email addresses. Target calendar systems may be associated with person attribute 505, which may be merely an email address association to that person. Thus, for purposes of an individual synchronizing two personal calendars on disparate systems, person attribute 505, among multiple sets of attributes, may represent that same person's multiple instances of a calendar across the network. This is because person attribute 505 may have one or more references to target calendaring systems. The agent may parse person attribute 505 to find a target calendaring system reference. For example, if an implementation of an agent accepts an email address to describe the person attribute, the agent may treat the portion of the email address that follows the "@" as a target calendaring system reference. For example, the agent may parse a person attribute, johndoe@example.com to find a target calendaring system reference "example.com". Alternatively, an agent may use person attribute 505 to look-up a reference to a target calendaring system from a database.

Event 550 may be a specific instance of event 500. Event 550 may be comprised of "8:30 AM; 10:30 AM" 511 in the time attribute, "physical fitness" 513 in the category attribute, "Cecil" 515 in the person attribute, "meeting" 517 in the type of entry attribute, "ALX2J9" 518 in the unique identifier attribute, and "ADD & SYNCH" 519 in the action attribute. It is appreciated that a time attribute may include offsets from universal time coordinated (UTC), as well as generally accepted time-zone designations. In this example, the agent may use "Cecil" 515 as a key to lookup a target calendaring system in a database.

Event 550 may be a native event. A native event is an event that possesses attributes and orders such attributes to conform to the operation of a target calendaring system. In other words, more attributes may exist, for example, authentication or encryption attributes. When a target calendaring system uses such attributes, the agent may provide such attributes. Thus, event 550 may represent an event before it is converted and formatted to a native event, or event 550 may represent an event after formatting into a native event.

Figure 6:
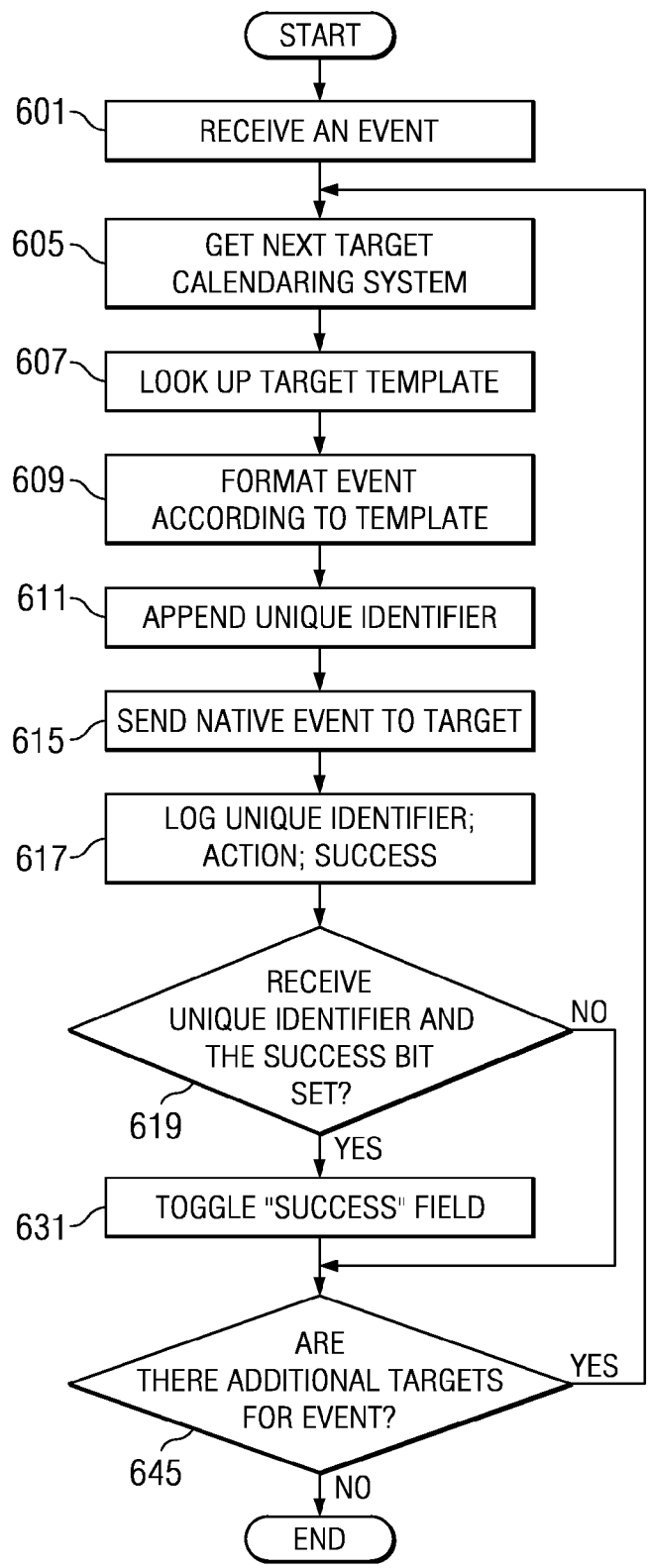
FIG. 6 shows a flow diagram of steps to make an invitation to at least one calendaring system under the control of a peer in accordance with an illustrative embodiment of the present invention.

FIG. 6 shows steps that may be implemented by an embodiment of the present invention when attempting to synchronize between two calendars that are made by different manufacturers. For example, an employee working in a customer's office may be using the customer's calendaring system, for example, Microsoft Outlook, to schedule time with his boss at the home office using a different calendaring system, for example, Lotus Notes. Additional target systems, for example, of a dotted-line reporting boss, may also be synchronized by performing multiple iterations of steps 605—645.

Initially, an agent operating on a computer may receive an inbound event, for example, from a user. An inbound event may have attributes in common with a target calendar native event, for example, a time attribute and a person attribute. An inbound event may have attributes beyond those in the native event, for example, Microsoft Outlook includes a "location"

attribute in some calendar invitations. Note that the inbound event may have more attributes than shown in FIG. 5.

The inbound event may include multiple person attributes, or multiple persons in a single attribute, but delimited such that an agent may parse multiple persons from the attribute. For this example, there are multiple persons parsed from the same attribute. The agent receives an inbound event (step 601), perhaps via a local area network adapter. The local area network adapter may be, for example, local area network adapter 210 of FIG. 2. The agent identifies a target by, for example, relying on the first person appearing in the person attribute. The first person may operate as a key in a table lookup in a storage system. The key permits the agent to get the next target calendaring system (step 605). Such a table may include a name or identifier of the type of calendaring system that is the target, for example, Lotus Notes, and Microsoft Exchange server. The next target calendaring system may be the first and only target calendaring system. The target calendaring system may be addressable as a uniform resource locator (URL), such as, for example, an email address, wherein such a detail may be available from the table lookup. The agent may be, for example, agent 353 of FIG. 3. The storage may be, for example, storage 363 of FIG. 3.

Since the agent knows the type of calendaring system, the agent may look up a target template for the target system (step 607). The target template may be a table for a pair of calendaring systems, for example "system a", and "system b", that shows how to copy, truncate or otherwise format an attribute from an inbound event to store the attribute, at least in part, in an attribute of a native event.

The agent then uses the template to select from inbound event attributes, those attributes with which "system b" is compatible and format the event attributes according to the template (step 609).

The agent may create a unique identifier in a limited string space by increasing a serial number for each event that needs to be sent. The agent appends the unique identifier with other data to form a synchronization event (step 611). Processor sends the native event to the target calendaring system (step 615). The action attribute may contain "ADD & SYNCH" which may be interpreted by the target calendaring system, of, for example, a user's boss, as a request to add the event to the calendar.

The agent logs the unique identifier into a log in a storage, for example, storage 363 of FIG. 3, and the action attribute of the native event. Then the agent toggles a success field or bit to '0' and logs the success bit, the action attribute, and the unique identifier (step 617). Until a response is returned from the target system, the agent keeps the success bit set to '0'.

The target system may receive the native event. Since the native event may have additional attributes that make the event compliant with the vCalendar® standard, it may be that the target system acknowledges conformance with the vCalendar standard, and sends back a packet or other transmittal containing the unique identifier and a bit set to "success". VCalendar is a registered trademark of Internet Mail Consortium. An alternate version of the embodiment may permit, instead, an acknowledgement that the owner of the calendar system at the target has accepted an invitation, wherein the target system sends back a packet containing the unique identifier and a bit set to "success", thus signaling user acceptance. In both cases, if a response arrives at the agent having both the unique identifier and the success bit set, within an appropriate time-out period, a "yes" occurrence of the test happens (step 619).

Upon receiving a message having a success and a unique identifier within a time-out period (step 619), the agent toggles the "success" field of the log entry (step 631). The agent may toggle "success" to a binary "1". A "no" result concerning receipt of the success and unique identifier (step 619) skips over said toggle (step 631). A test for further targets occurs (step 645). If "yes", the agent gets the next target calendaring system (step 605) and repeats the steps 605—645. If the result is "no", processing ends.

Figure 7:
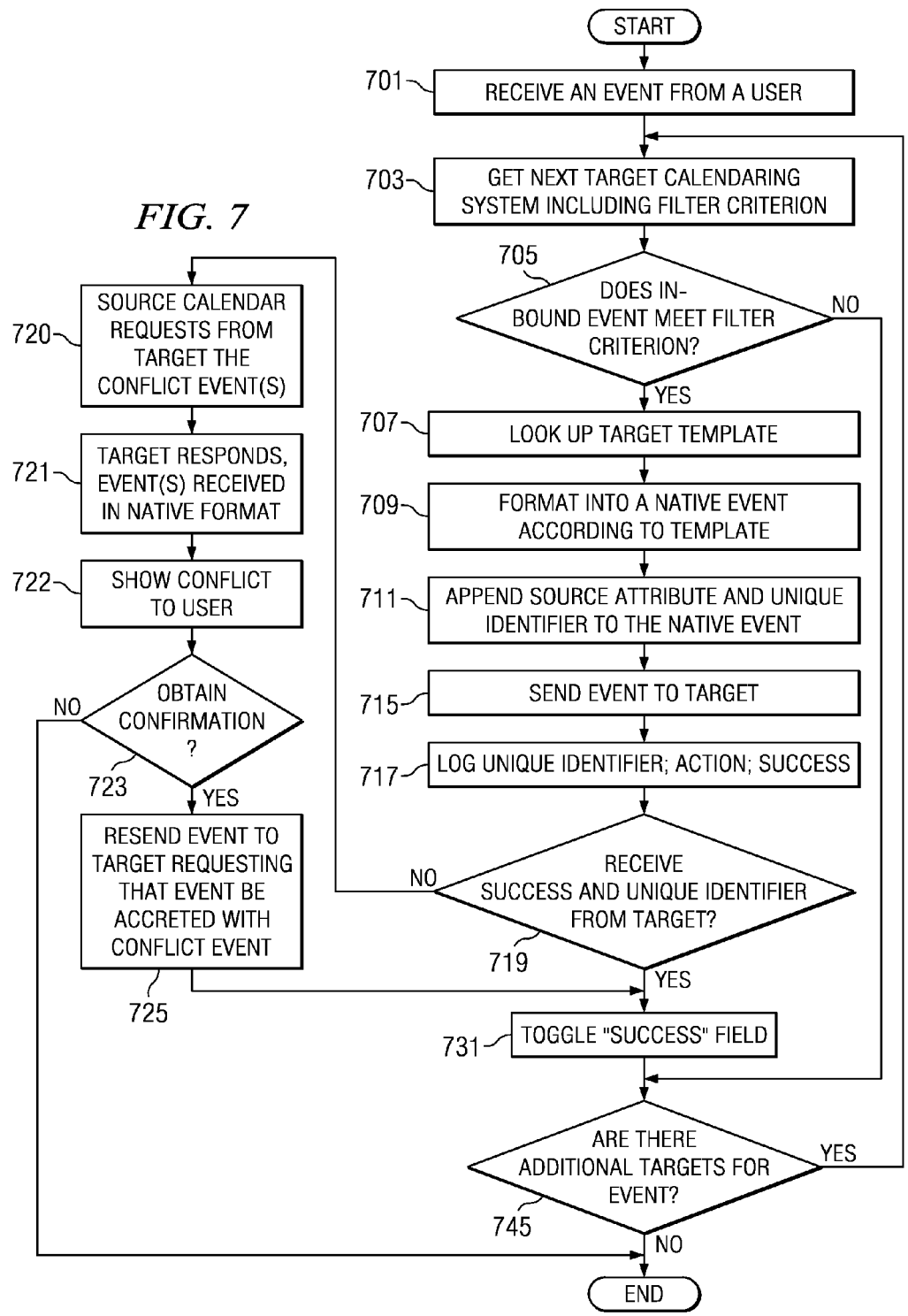
FIG. 7 shows a diagram of a flow diagram of steps to send an event to at least one calendaring system under the control of a peer in accordance with an illustrative embodiment of the present invention.

FIG. 7 shows steps that may be implemented by an illustrative embodiment of the present invention when attempting to synchronize between two calendars that are potentially under the control of the same person. For example, a person may be trying to synchronize his calendar used by his client's office with the calendaring system of his employer. The topology of FIG. 4 may depict the communication of the agent.

Initially, an agent receives an event from a user (step 701). The event arrives via an inter-process communication or message, such as may occur if the agent is hosted on the same computer with the source calendaring system. Alternatively, an agent may receive an event from a user via a local area network adapter. The local area network adapter may be, for example, local area network adapter 210 of FIG. 2. The inbound event may include multiple uniform resource locator (URL) attributes, wherein each uniform resource locator may be an email address for a calendaring system. Alternatively, the inbound event may include multiple uniform resource locators in a single attribute, but delimited such that multiple uniform resource locators may be parsed from the attribute.

The agent gets next target calendaring system, for example, by parsing the uniform resource locator attribute (step 703). The user may have specified one or more criteria to permit only some inbound events to be synchronized, for example, that the event specify a time between 8:00 AM and 5:00 PM on the same day. The criterion may be specified for each target calendaring system. As such, an entry in a target calendaring system table may include a filter criterion. A test is made to see if the inbound event meets the filter criterion (step 705). A "no" causes processing to continue to test to see if additional target calendaring systems exist in the inbound event (step 745). A met criterion or "yes" at step 705 causes the agent to look up or obtain a target template for the target calendaring system (step 707).

The agent may format the event into a native event according to the target template (step 709). The target template may be a table for a pair of calendaring systems, for example "system a", and "system b", that shows how to copy, truncate or otherwise format an attribute from an inbound event to store the attribute, at least in part, in an attribute of a native event.

The agent may append a source attribute and append a unique identifier to the native event (step 711). The source attribute, like the unique identifier, assists the agent and the target calendar to engage in responsive messaging and maintain a context to the messages. The source attribute may help the target calendar to determine if the target calendar will accept an event from the agent, and what, if any, source tag should be associated with the event on the target calendar system. The agent then sends the native event to the target calendaring system (step 715). Once sent, the native event becomes a sent event.

The agent may log the unique identifier, and the action attribute (step 717). In addition, the agent logs a success attribute by logging a binary '0' bit associated with the sending of the native event. Thus, the agent logs the sending of the synchronization event.

In one case, the target system may send a packet or message back to the agent wherein the message includes the unique identifier and a success bit set to "1". This causes the test of whether the agent received a success and the unique identifier to result in a "yes" (step 719). Processing at the agent may continue to toggle the success attribute stored earlier in the log (step 731).

However, in another case, the target system may send a packet or message back to the agent wherein the message includes the unique identifier and a success bit set to "0". When the agent receives a unique identifier and a "0" success bit, the agent receives a conflict signal. Further action from the user may be necessary to add the sent event to the target system calendar, thus the "no" branch directs processing such that the agent requests, from the target system, the conflicting events (step 720). The target system may respond, whereby the agent receives one or more events, perhaps in a native format of the target system (step 721).

Based on receiving a message of one or more events, the agent may show a conflict message to the user, perhaps using a graphical user interface (step 722). The user may confirm the addition of the new event to the target calendar system. Thus, the user may cause a positive outcome to "obtain confirmation" test (step 723). In other words, the agent receives a user confirmation. Such an outcome causes the agent to continue by resending the event to the target requesting that the event be accreted with the conflicting event or events (step 725). Accreting means that the system that accretes the event adds the event to the calendar such that the conflict remains, and two scheduled activities are shown or stored in such manner as to occupy the same time period. After requesting the accretion, the agent may toggle the success attribute (step 731). Following the step 731 or negative outcomes to steps 705 and 723, the agent may determine if further targets exist for the event (step 745). A uniform resource locator may represent each target. If additional uniform resource locators exist, the agent begins an iteration with step 703. If no additional uniform resource locators exist, processing ends.

Figure 8A:
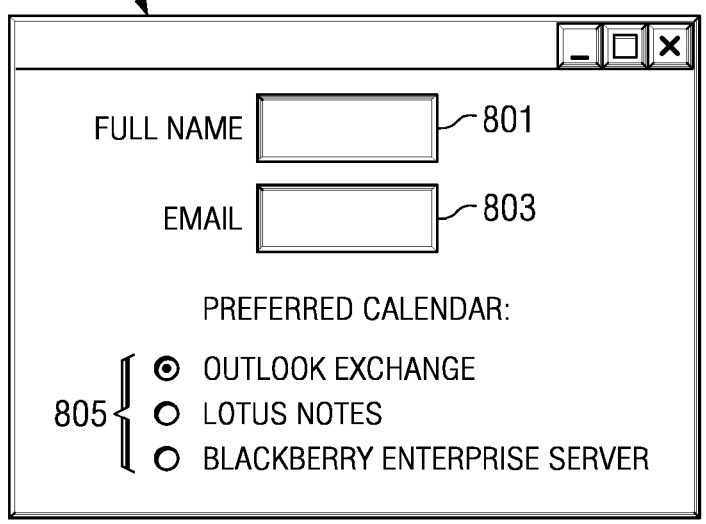
FIG. 8A shows a user interface to collect assignments between email addresses and templates in accordance with an illustrative embodiment of the present invention.

FIG. 8A shows a representative graphical user interface of an illustrative embodiment of the present invention. The user interface may be dialog box 800 which provides a text attribute for a user of a calendaring system to identify which named contacts use which calendaring system format or templates. The agent may prompt a user by displaying dialog box 800 and providing customary navigation and interaction among fields and other interfaces. Alternatively, an agent may use other methods of prompting, such as questions and answers. Name attribute 801 may permit a user to enter first and last names of a contact person or other entity. Email attribute 803 may permit a user to enter the email address for the user or the user's calendaring system. Series of radio buttons 805 may include the captions of calendaring systems for which a mapping of attributes is known. In other words, for each caption a template is known and stored in a storage facility accessible to the agent. Such calendaring systems may include Outlook Exchange, Lotus Notes, and Blackberry Enterprise Server, for example. In addition, the dialog box may have a caption for an industry standard calendar, for example, vCalendar. When a user selects a radio button, the agent may receive a user input specifying the calendar type or template to associate with a name or person attribute 801. Thus, a user may show a contact's connection with the template stated in the caption of the radio button. Alternatively, the user may show a connection between the calendar type and a uniform resource locator.

Figure 8B:
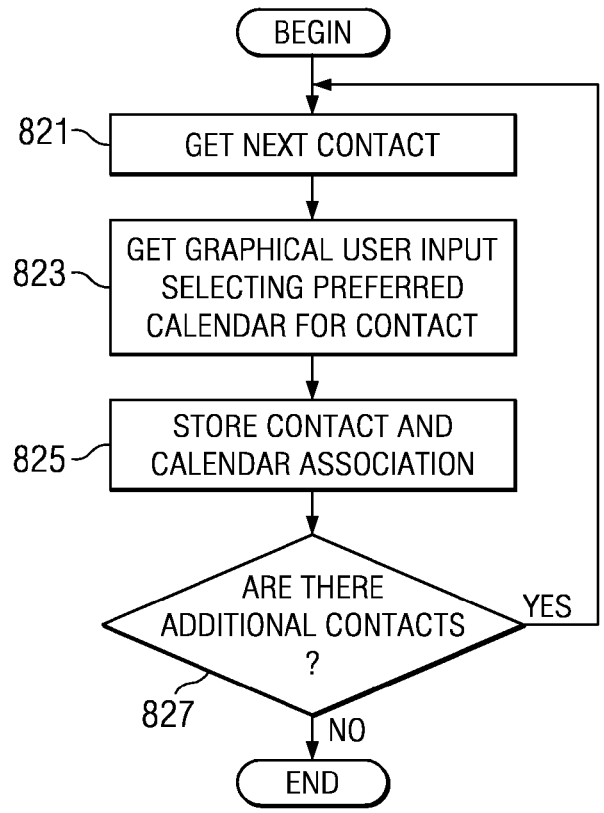
FIG. 8B shows steps used to collect assignments in accordance with an illustrative embodiment of the present invention.

FIG. 8B shows steps for collecting calendaring system associations for a list of contacts of an illustrative embodiment of the present invention. The agent accesses a list of contacts. In one illustrative embodiment of the present invention, a user may have many contacts in a contacts database. Therefore, the contacts database may be a source for the list of contacts. In another illustrated embodiment of the present invention, the user may provide the list of contacts for each instance where the user would like to send out an event notification. Thus, the list would be user-supplied, and the agent would receive a user input specifying the calendar type to associate with a person attribute. In both cases, an agent may collect information to associate a calendar type with a person attribute, for example, a person attribute that includes a uniform resource locator. A first step of the agent is to obtain the next contact in the list (step 821). The agent gets the graphical user input that selects the preferred calendaring system for the contact (step 823). Then the agent stores the contact and the calendar association (step 825) in a database. The database may be storage 363 of FIG. 3, for example. The agent may perform a test to see if additional contacts remain in the list (step 827). If "yes", then another iteration continues with step 821. Otherwise, the process may end.

Thus, it is shown how illustrative embodiments may provide an agent that, in an ad hoc manner, updates an event on a calendar in which a user is currently logged on and sends a native event to another calendar system to which the user is entitled to update.

The invention can take the form of an entirely hardware embodiment, an entirely software embodiment or an embodiment containing both hardware and software elements. In a preferred embodiment, the present invention is implemented in the software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for translating a calendar event from a scheduled calendar entry of a source calendaring system to a scheduled calendar entry of a target calendaring system, the method comprising the steps of:
receiving from the source calendaring system a calendar event message describing the scheduled calendar event in the source calendaring system, the message formatted according to the source calendaring system;

responsive to receiving the calendar event message, determining from attributes of the scheduled calendar event contained in the calendar event message a top level domain and a second level domain of an address of the target calendaring system;

identifying the top level domain and the second level domain in a lookup table which correlates the top level domain and the second level domain to a template mapping attributes of the calendar event message formatted for the source calendaring system to attributes of a corresponding calendar event message formatted for the target calendaring system;

identifying the template for the target calendaring system from the lookup table in response to identifying the top level domain and the second level domain, using the template to map attributes of the calendar event message from the format of the source calendaring system to the format of the target calendaring system and generating the calendar event message with attributes of the scheduled calendar event in the format of the target calendaring system based on the mapping in the template; and sending to the target calendaring system the calendar event message with attributes of the schedule calendar event in the format of the target calendaring system for scheduling as a calendar entry in the target calendaring system.

2. The computer implemented method of claim 1 further comprising:

responsive to using the template to map attributes of the calendar event message from the format of the source calendaring system to the format of the target calendaring system and generating the calendar event message with attributes that the scheduled calendar event in the format of the target calendaring system based on the mapping in the template, creating a unique identifier for the calendar event message with attributes of the scheduled calendar event in the format of the target calendaring system;

recording the unique identifier and an associated successful field into a log;

appending the unique identifier to the calendar event message with attributes of the scheduled calendar event in the format of the target calendaring system;

wherein the step of sending the calendar event message the target calendar system is in response to appending the unique identifier to the calendar event message.

3. The computer implemented method of claim 2, wherein the unique identifier is an incremented serial number stored in a limited string space of the calendar event message.

4. The computer implemented method of claim 2 further comprising:

receiving a response from the target calendaring system; and responsive to identifying a set success bit within the response, toggling the success field to indicate acceptance of the calendar event message by the target calendaring system.

5. The computer implemented method of claim 2 further comprising:

responsive to identifying the template for the target calendaring system, identifying a set of filter criteria corresponding to the target calendaring system;

wherein the steps of generating the calendar event message and sending the calendar event message are performed in response to a determination that the set of filter criteria is met.

6. The computer implemented method of claim 5, wherein the set of filter criteria comprises a filter criterion restricting sending events to the target calendaring system when the target calendaring system is associated with a user's work, wherein the filter criterion disallows events occurring on specified dates.

7. A non-transitory computer readable storage medium having computer usable program code stored thereon for translating a calendar event from a scheduled calendar entry of a source calendaring system to a scheduled calendar entry of a target calendaring system comprising:

computer usable program code configured to receive from the source calendaring system a calendar event message describing the scheduled calendar event in the source calendaring system, the message formatted according to the source calendaring system;

computer usable program code, responsive to receiving the calendar event message, configured to determine from attributes of the scheduled calendar event contained in the calendar event message a top level domain and a second level domain of an address of the target calendaring system;

computer usable program code configured to identify the top level domain and the second level domain in a lookup table which correlates the top level domain and the second level domain to a template mapping attributes of the calendar event message formatted for the source calendaring system to attributes of a corresponding calendar event message formatted for the target calendaring system;

computer usable program code configured to identify the template for the target calendaring system from the lookup table in response to identifying the top level domain and the second level domain, using the template to map attributes of the calendar event message from the format of the source calendaring system to the format of the target calendaring system and generating the calendar event message with attributes of the scheduled calendar event in the format of the target calendaring system based on the mapping in the template; and computer usable program code configured to send to the target calendaring system the calendar event message with attributes of the schedule calendar event in the format of the target calendaring system for scheduling as a calendar entry in the target calendaring system.

8. The non-transitory computer readable storage medium of claim 7 further comprising:

computer usable program code, responsive to using the template to map attributes of the calendar event message from the format of the source calendaring system to the format of the target calendaring system and generating the calendar event message with attributes that the scheduled calendar event in the format of the target calendaring system based on the mapping in the template, configured to create a unique identifier for the calendar event message with attributes of the scheduled calendar event in the format of the target calendaring system;

computer usable program code configured to record the unique identifier and an associated successful field into a log;

computer usable program code configured to append the unique identifier to the calendar event message with attributes of the scheduled calendar event in the format of the target calendaring system;

wherein the computer usable program code configured to send the calendar event message the target calendar system is in response to appending the unique identifier to the calendar event message.

9. The non-transitory computer readable storage medium of claim 8, wherein the unique identifier is an incremented serial number stored in a limited string space of the calendar event message.

10. The non-transitory computer readable storage medium of claim 8, further comprising:
- computer usable program code configured to receive a response from the target calendaring system; and
- computer usable program code, responsive to identifying a set success bit within the response, configured to toggle the success field to indicate acceptance of the calendar event message by the target calendaring system.

11. The non-transitory computer readable storage medium of claim 8 further comprising:
- computer usable program code, responsive to identifying the template for the target calendaring system, configured to identify a set of filter criteria corresponding to the target calendaring system;
- wherein the computer usable program code configured to generate the calendar event message and send the calendar event message are performed in response to a determination that the set of filter criteria is met.

12. The non-transitory computer readable storage medium of claim 11, wherein the set of filter criteria comprises a filter criterion restricting sending events to the target calendaring system when the target calendaring system is associated with a user's work, wherein the filter criterion disallows events occurring on specified dates.

13. A computer comprising:
- a bus;
- a storage device connected to the bus, wherein computer usable program code is located in the storage device;
- a communication unit connected to the bus;
- a processing unit connected to the bus, wherein the processing unit executes the computer usable program code:
  - to receive from the source calendaring system a calendar event message describing the scheduled calendar event in the source calendaring system, the message formatted according to the source calendaring system;
  - in response to receiving the calendar event message, to determine from attributes of the scheduled calendar event contained in the calendar event message a top level domain and a second level domain of an address of the target calendaring system;
  - to identify the top level domain and the second level domain in a lookup table which correlates the top level domain and the second level domain to a template mapping attributes of the calendar event message formatted for the source calendaring system to attributes of a corresponding calendar event message formatted for the target calendaring system;
  - to identify the template for the target calendaring system from the lookup table in response to identifying the top level domain and the second level domain, using the template to map attributes of the calendar event message from the format of the source calendaring system to the format of the target calendaring system and generating the calendar event message with attributes of the scheduled calendar event in the format of the target calendaring system based on the mapping in the template; and
  - to send to the target calendaring system the calendar event message with attributes of the schedule calendar event in the format of the target calendaring system for scheduling as a calendar entry in the target calendaring system.

14. The computer of claim 13 wherein the processing unit executes the computer usable program code:
- responsive to reformatting using the template to map attributes of the calendar event message from the format of the source calendaring system to the format of the target calendaring system and generating the calendar event message with attributes that the scheduled calendar event in the format of the target calendaring system based on the mapping in the template, to create a unique identifier for the calendar event message with attributes of the scheduled calendar event in the format of the target calendaring system;
- to record the unique identifier and an associated successful field into a log;
- to append the unique identifier to the calendar event message with attributes of the scheduled calendar event in the format of the target calendaring system;
- wherein the processing unit executing the computer usable program code to send the calendar event message the target calendar system is in response to appending the unique identifier to the reformatted calendar event message.

15. The computer of claim 14, wherein the unique identifier is an incremented serial number stored in a limited string space of the calendar event message.

16. The computer of claim 14 wherein the processing unit further executes the computer usable program code:
- to receive a response from the target calendaring system;
- and responsive to identifying a set success bit within the response, to toggle the success field to indicate acceptance of the calendar event message by the target calendaring system.

17. The computer of claim 14 wherein the processing unit executes the computer usable program code:
- responsive to identifying the template for the target calendaring system, to identify a set of filter criteria corresponding to the target calendaring system;
- wherein the processing unit executing the computer usable program code to generate the calendar event message and send the calendar event message are performed in response to a determination that the set of filter criteria is met.

18. The computer of claim 17, wherein the set of filter criteria comprises a filter criterion restricting sending events to the target calendaring system when the target calendaring system is associated with a user's work, wherein the filter criterion disallows events occurring on specified dates.

* * * * *